No. 645,823. Patented Mar. 20, 1900.
A. R. MARTIN.
COUPLING FOR AIR BRAKES.
(Application filed Sept. 13, 1899.)
(No Model.) 3 Sheets—Sheet 1.
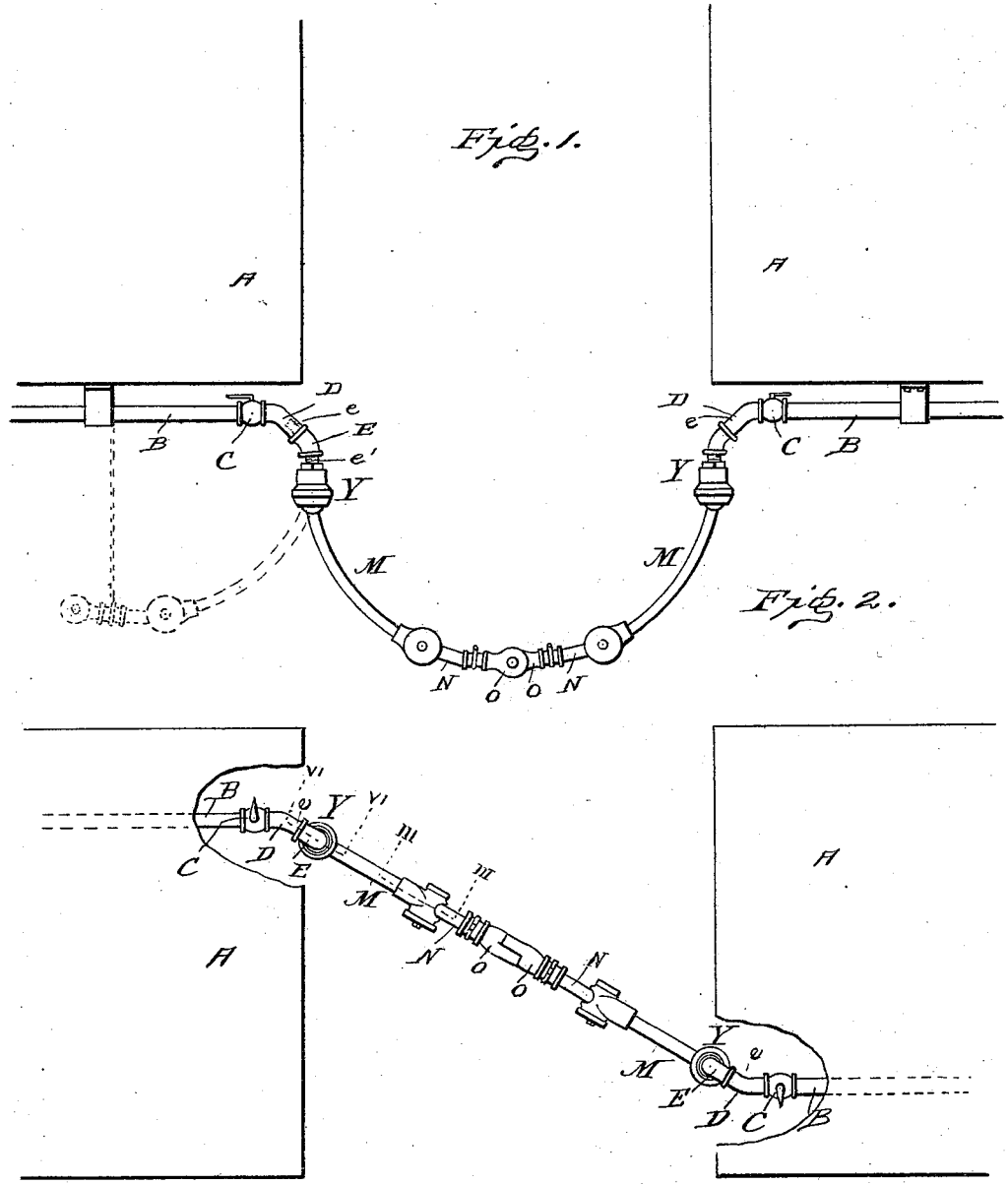

No. 645,823. Patented Mar. 20, 1900.
A. R. MARTIN.
COUPLING FOR AIR BRAKES.
(Application filed Sept. 13, 1899.)
(No Model.) 3 Sheets—Sheet 2.
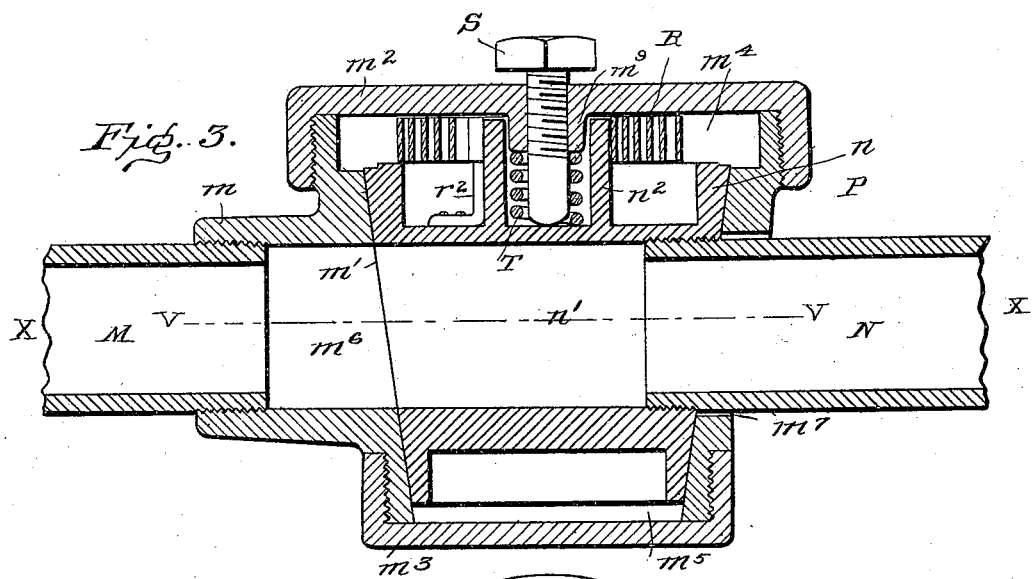
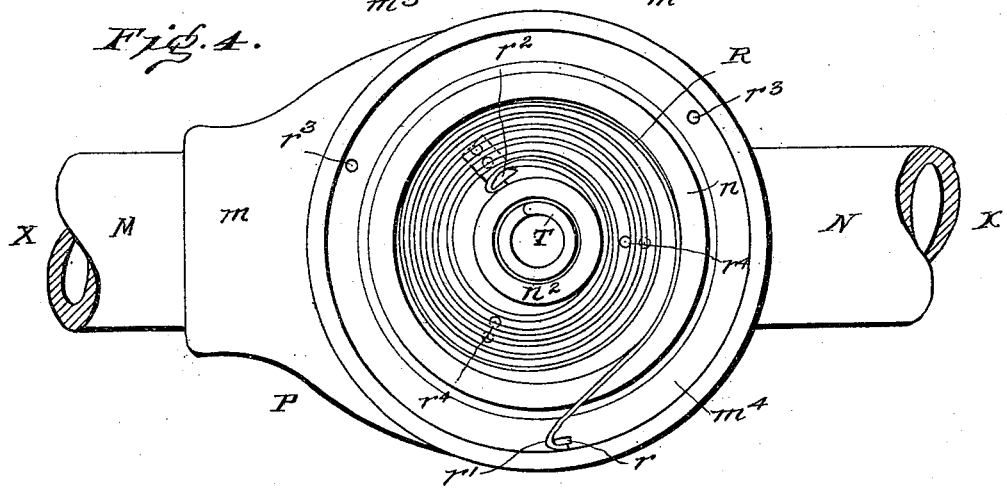
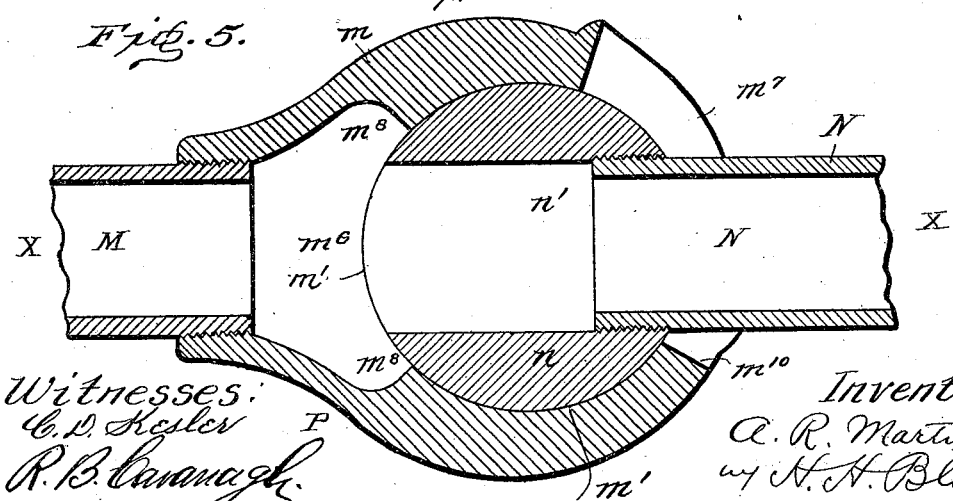
Witnesses:
C. L. Kesler
R. B. Cavanagh
Inventor
A. R. Martin
by H. H. Bliss
Attorney
THE NORRIS PETERS CO., PHOTO-LITHO., WASHINGTON, D. C.

No. 645,823. Patented Mar. 20, 1900.
A. R. MARTIN.
COUPLING FOR AIR BRAKES.
(Application filed Sept. 13, 1899.)
(No Model.) 3 Sheets—Sheet 3.
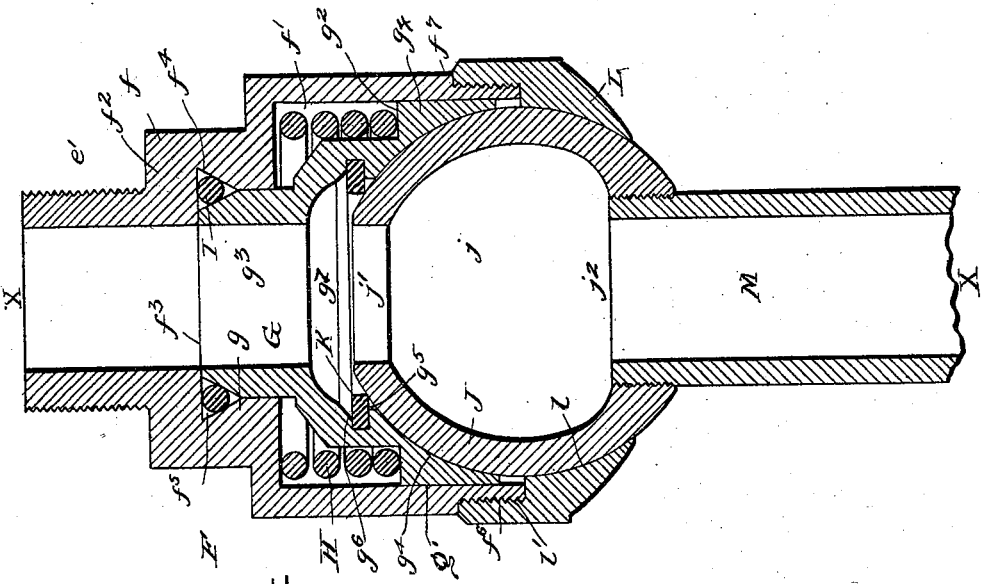
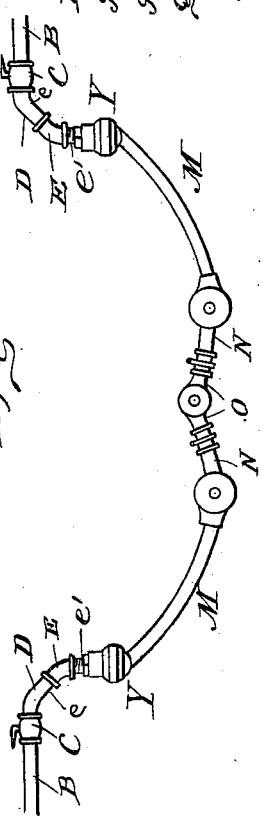
Witnesses:
C. D. Hesler
R. B. Cavanagh
Inventor:
A. R. Martin
by H. H. Bliss
Attorney
THE NORRIS PETERS CO., PHOTO-LITHO., WASHINGTON, D. C.

UNITED STATES PATENT OFFICE.

ALBERT R. MARTIN, OF BEAVER FALLS, PENNSYLVANIA.

COUPLING FOR AIR-BRAKES.

SPECIFICATION forming part of Letters Patent No. 645,823, dated March 20, 1900.

Application filed September 13, 1899. Serial No. 730,360. (No model.)

*To all whom it may concern:*

Be it known that I, ALBERT R. MARTIN, a citizen of the United States, residing at Beaver Falls, in the county of Beaver and State of Pennsylvania, have invented certain new and useful Improvements in Couplings for Air-Brakes and other Purposes, of which the following is a specification, reference being had therein to the accompanying drawings.

In order to make my invention more clearly understood, I have shown in the accompanying drawings means for carrying the same into practical effect without limiting my improvements in their useful applications to the particular constructions which for the sake of illustration I have delineated.

In said drawings, Figure 1 is a side elevation showing in diagram the abutting ends of two railway-cars having their train-pipes connected by coupling devices embodying my invention. Fig. 2 is a plan view of the same. Fig. 3 is a sectional view, full sized, taken on lines III III of Fig. 2. Fig. 4 is an end view of the joint shown in Fig. 3 with the cap removed. Fig. 5 is a sectional view on line V V, Fig. 3. Fig. 6 is a sectional view on line VI VI of Fig. 2. Fig. 7 is a side elevation of the entire coupling device with the parts in position which they assume at the time of the automatic uncoupling.

Referring to the drawings, A A indicate the bodies of railway-cars having air or steam train-pipes of any usual or suitable character provided at their ends with cut-off valves C and beyond said valves with downwardly-turned ends D. In the ordinary construction of such pipes said parts D will be formed of bends or elbows at an angle of forty-five degrees from the horizontal line of the pipe B. Viewed vertically the parts D also make an angle of thirty degrees with the vertical plane of the train-pipe, as seen in Fig. 2.

E is an elbow of forty-five degrees having a screw-threaded end or thimble $e$, which connects with the part B, bringing the lower end of said elbow into a vertical line, where it is provided with a screw-threaded end or thimble $e$. This latter connection $e$ is connected with a casing F, with which it is preferably integral. The casing F may be formed with a nut-surface $f$ or other means whereby it may be readily manipulated, and is also formed with an interior chamber $f'$, open at its lower end. Said chamber has an upward extension $f^2$ of smaller diameter, which terminates at a horizontal shoulder $f^3$. Contiguous to said shoulder the vertical walls of the extension $f^2$ are flared or inclined relative to the longitudinal axis of the casing, as shown at $f^4$, Fig. 6, forming a groove $f^5$. The lower end of the casing F is formed with a screw-thread $f^6$.

G is a socket-piece fitting within the casing F, having an upward extension $g$, which fits within the corresponding extension $f^2$ of the casing and also fitting the interior wall of the chamber $f'$ at its lower end by means of a bearing-surface $g'$. The latter surface terminates at a horizontal shoulder $g^2$, above which latter the socket-piece G is of less diameter than the interior of the casing, leaving a space in which is received a coiled spring H, which bears upward against the top of the chamber $f'$ and downward against the said shoulder $g^2$. Said spring is normally under tension and tends to press the socket-piece G toward the lower end of the casing F. The upper end of the socket-piece G is tubular, as shown at $g^3$, to form a portion of the continuous duct X through the whole coupling device. The outer wall of the extension $g$ is inclined or tapered oppositely to the incline $f^4$ of the casing, forming a space within which is situated a packing-ring I of suitable material—such as a vulcanized asbestos, lead, or other durable material. The fluid-pressure within the duct X tends constantly to seat the packing-ring I closely upon said inclined walls of the casing and socket-piece and to wedge it between them, thus making the joint between said parts effectually air-tight.

$g^4$ is a parti-spherical seat formed in the lower end of the socket-piece G, and above said seat the socket-piece is provided with a circular recess $g^5$, adapted to receive a washer or ring K, of suitable material.

J is a ball having an interior chamber $j$, adapted to form a part of the continuous duct X by means of end openings $j'$ $j^2$. The outer surface of said ball is a more or less complete sphere, the upper portion of which corresponds with and fits within the seat $g^4$ of the socket-piece, the said seat and the exterior of the ball being formed on the same radius.

L is a supplemental socket-piece, preferably in the form of a ring or nut, having an interior spherical surface $l$ of the same radius as the lower portion of the ball J and closely fitting the same. It is further provided with screw-threads $l'$, adapted to engage the thread $f^6$ of the casing F, whereby the supplemental socket-piece may be screwed upon the casing to such distance that the spring H will be compressed sufficiently to cause a close and air-tight, but yielding, contact between both socket-pieces and the surface of the ball. In order that the part L may be brought to a firm bearing on the casing, a shoulder $f^7$ is provided on the latter at the base of the thread $f^6$, against which shoulder the part L may be tightly screwed, the length of the screw-threaded surface being sufficient to allow first for the compression of the spring H for the purpose above described.

In ball-and-socket joints, especially when used for conducting steam, I have experienced great difficulty and damage to the joint from small particles of scale carried by the steam working between the bearing-surfaces of the ball and socket and acting to separate the parts of the joint and cause leakage and wear. This I have obviated by means of the washer K, already referred to. The recess or seat $g^5$ is formed in the socket-piece G, opposite the upper part of the ball J, in which seat is retained the annular cleaning-washer K, of asbestos or other suitable durable material. The latter rests on the bearing-surfaces of the ball J and excludes from the joint any scale or other foreign matter. Above the washer K the seat $g^5$ is cut away or enlarged, as shown at $g^6$, to admit the fluid-pressure in the duct X to the upper part of the washer and keep the latter in close engagement with the ball.

Above the seat $g^4$ the part G is formed with a chamber $g^7$ of greater diameter than the opening $j'$ of the ball, whereby the latter may have sufficient play in its socket, according to the relative movements of the coupled cars, without cutting off or restricting the full area of the duct X. In the original perfect condition of this joint it will be understood that the parts are made and finished with such accuracy that when the part L is screwed up to a firm bearing the upper end of the extension $g$ bears against the shoulder $f^3$ of the casing, but without any clamping action upon the ball J. Therefore any wear of the ball and socket is constantly taken up by the spring H and a durable and perfect air-tight joint secured.

The destructibility and frequent bursting of the usual flexible rubber pipes employed in the steam and air couplings of railway-cars have led to many efforts to construct of metal or other rigid material a practical and efficient substitute for such flexible pipes; but such serious obstacles have been encountered in the proper construction and arrangement of the movable or working joints which such rigid pipes must have that the production of a practical and durable coupler of rigid pipe-sections is a matter of the greatest difficulty.

With many arrangements of joints that have been proposed the relative movement of the coupled cars will cramp such joints frequently to such extent as to break the connection and set the brakes or permit the escape of the steam. By my improvements, however, consisting in the nature and relations of the joints and the shape or direction of the main rigid pipe, all such difficulties and accidents are avoided. Instead of interposing two ball-and-socket joints between the train-pipe and the main rigid movable pipe, which I have found in practice to be a source of the cramping and accidents above mentioned, I employ a single movable joint having a vertical axis and preferably of the universal character comprising the parts F G J, above described. I term the joint "movable" in contradistinction to the fitting-joints which do not turn in use and which merely serve to unite certain parts of the device immovably with each other. Directly from this single movable joint, which I indicate as a whole by Y, the main rigid pipe M of the connection extends toward the point of coupling. The shape of the pipe is such that it extends upon a curve downward and inward, so that the two members of the whole coupling form a loop approximately that of the ordinary flexible (rubber) coupling.

It will be observed from the construction above described that the rigid pipe M swings directly from the body of the car from a single pivotal point, one member of the universal joint F J being mounted rigidly or immovably upon the car, while the other member of said joint is fixed immovably directly upon the end of the said pipe. It will be understood that this joint could be inverted and still realize the advantages of my invention to a considerable extent; but the position illustrated is superior, for the reason that the surface of the ball is protected by the overhanging parts from cinders and foreign matter, which would not be the case if the ball member of the joint were fixed to the car. The pipe M, thus free to swing according to the tipping or turning of the car-body without any binding or cramping whatever, which would result from a plurality of supporting-joints, carries at its outer end a supplemental pipe or pipe-section N by a joint having a horizontal and substantially-transverse axis. This joint is so constructed that, together with the pipe M and the pipe N, it forms a part of the continuous duct X. At its outer end the pipe N has fixed to it a coupler of any usual or preferred character, the parts of which may be joined together and locked in a well-known manner by first placing the pipes N at an angle to each other with their meeting ends elevated and then allowing said pipes to drop into substantially-horizontal position, and which will automatically uncouple if the cars should become uncoupled and draw the whole device upward.

Referring to the joint P, $m$ is a case or socket-piece fixed upon the end of the pipe M, as by a screw-thread, and bored transversely to form a frusto-conical seat $m'$, preferably extending entirely through the case, so that the latter will have an opening at each side. These openings are closed by screw-caps $m^2 m^3$, forming oil-chambers $m^4 m^5$. The case communicates at one end with the pipe M by a duct portion $m^6$ and has at the other end a vertically-elongated opening $m^7$.

$n$ is a rotary plug formed to fit exactly in the seat $m'$ and having a transverse duct portion $n'$, which communicates with the duct $m^6$. The latter is elongated vertically by cutting away portions of the case next to the seat $m'$, Fig. 5, so that the turning of the plug will not cut off or diminish the area of the duct X. Fixed in the other end of the duct $n'$ and passing out through the aperture $m^7$ is the pipe N. It is desirable to insure that the couplers O shall not become detached from each other accidentally or except when they are intentionally uncoupled or when they act automatically in case of the uncoupling of the cars, as above described. To this end I combine with the joint P a spring which acts between the member M $m$ of said joint on the one hand and the member N $n$ on the other hand in such manner as to tend to depress the pipe N and hold it at or near the lower end of the opening $m^7$, with the couplers O in their locked position. While this spring may be applied in various ways to effect this result, I prefer the construction illustrated, in which the spring (shown at R) is entirely inclosed within the case $m$.

Referring especially to Figs. 3 and 4, $r$ is a lug or other fastening device fixed within the case, preferably in the chamber $m^4$, and serving as a point of attachment for the hooked end $r'$ of the spring. From this point the spring extends in a coil inward to another fastening device $r^2$, secured to the plug $n$. The spring is held under tension between said fastening devices, and the direction of the coil is such that the spring draws the pipe N downward for the purpose above described. In order that the tension of the spring R may be varied according to the fluid-pressure or other exigencies tending to cause an accidental separation of the couplers O, I provide for adjusting the position of the fastening device $r$, as by forming the case with one or more additional seats $r^3$ at different points, in which the device $r$ may be fixed, Fig. 4. I may similarly provide for the adjustment of the lug $r^2$ by seats $r^4$ in the plug $n$.

S is a stop-screw mounted in the cap $m^2$ and engaging the plug $m\,n$ to hold it exactly in its seat $m'$, so that no lateral pressure on the pipe N or any jar shall unseat the plug to permit leakage or admit dirt between the bearing-surfaces of the joint. This stop S is adjustable to follow up any wear of the joint. T is a spring interposed between the cap $m^2$ and the plug to take up wear irrespective of the adjustment of the stop S and keep the plug in its seat against any ordinary disturbing pressure. This spring is preferably held in place by the stop S, which it surrounds, and abuts against a boss $m^9$ on the cap $m^2$. $n^2$ is a tubular extension of the plug which incloses the stop S, spring T, and boss $m^9$ and also serves to center the coil of the spring R. The chambers $m^4$ and $m^5$ are kept charged with oil to insure an easy action of the joint P without leakage of air or steam.

An important feature of my invention consists in combining with an automatic uncoupler, the parts of which separate of themselves when pulled up by the separation of the cars, a system of metallic or other rigid parts forming an air or steam conduit and joined to have the same free movement and the same uncoupling pull as a rubber or other flexible pipe, at the same time producing a much stronger device which cannot be torn apart, as rubber pipes often are, without effecting with certainty the uncoupling. Furthermore, by the use of such rigid jointed parts I am enabled to provide positive stops for the coupler members, which compel them to turn on each other to the uncoupling angle as the whole device is straightened out. Thus as the coupled duct rises from the position shown in Fig. 1 to that shown in Fig. 7 the lower ends or shoulders $m^{10}$ of the aperture $m^7$ will encounter the pipes N and lift the latter, turning them into the position shown in Fig. 7. The joint effect of the single suspension-joint Y, the rigid pipes M N, and the horizontal joint P, with its limiting-stop $m^{10}$, is to make the duct as it is raised stiff or rigid throughout and give a positive turning action to the couplers O. I thus overcome the uncertain and defective uncoupling action of the flexible or hose-pipe ducts, which have not sufficient stiffness in any position to turn the couplers positively.

I do not claim herein the novel features of the ball-and-socket joint Y, except in combination with the other parts of the coupling which is the subject of this application, the said joint Y being the subject of my application, Serial No. 735,024, filed October 28, 1899, as a division hereof.

What I claim is—

1. In a flexible duct for railway-cars, a metallic or other rigid pipe, a single ball-and-socket joint having one of its members fixed on an immovable support on the car and communicating with the train-pipe and its other member on said pipe, and a coupler mounted directly on the outer end of said rigid pipe by means of a single joint having a horizontal transverse axis, substantially as set forth.

2. In a flexible duct for railway-cars the combination, with the train-pipes, of metallic or other rigid pipes jointed with said train-pipes and extending downwardly and outwardly toward each other, supplemental pipes jointed with said rigid pipes, springs acting between said rigid and supplemental pipes to depress the latter, and coupling means uniting said supplemental pipes, substantially as set forth.

3. In a flexible duct for railway-cars the combination, with the train-pipes, of metallic or other rigid pipes, each jointed with its train-pipe to turn upon a vertical axis, and extending downwardly and outwardly toward each other, supplemental pipes jointed with said rigid pipes upon horizontal axes, detachable coupling means uniting said supplemental pipes, and springs acting on said supplemental pipes to turn the latter on their axes toward their coupled position, substantially as set forth.

4. As an attachment for the train-pipe of railway-cars, a metallic or other rigid pipe bent downwardly and outwardly, a single movable joint having a vertical axis by which said rigid pipe is connected directly with the train-pipe and on which it may be turned to extend back beneath the car, a supplemental pipe-section jointed with said rigid pipe upon a horizontal axis, and coupling means for uniting said attachment with the corresponding attachment of another car, substantially as set forth.

5. In a flexible duct for railway-cars the combination, with the train-pipes, of metallic or other rigid pipes, joined with said train-pipes by universal joints, and extending downwardly and outwardly toward each other, supplemental pipes joined with said rigid pipes, springs acting between said rigid and supplemental pipes to depress the latter, and coupling means uniting said supplemental pipes, substantially as set forth.

6. In a flexible duct for railway-cars the combination with the train-pipes, of metallic or other rigid pipes, each jointed with its train-pipe by a universal joint, and extending downwardly and outwardly toward each other, supplemental pipes jointed with said rigid pipes upon horizontal axes, detachable coupling means uniting said supplemental pipes, and springs acting on said supplemental pipes to turn the latter on their axes toward their coupled position, substantially as set forth.

7. As an attachment for the train-pipe of railway-cars, a metallic or other rigid pipe bent downwardly and outwardly, a single universal joint having a vertical axis by which said rigid pipe is connected directly with the train-pipe and on which it may be turned to extend back beneath the car, and coupling means for uniting said attachment with the corresponding attachment of another car, substantially as set forth.

8. As an attachment for the train-pipe of railway-cars, a metallic or other rigid pipe bent downwardly and outwardly, a single universal joint by which said rigid pipe is connected directly with the train-pipe and on which it may be turned to extend back beneath the car, a supplemental pipe-section jointed with said rigid pipe upon a horizontal axis, and coupling means for uniting said attachment with the corresponding attachment of another car, substantially as set forth.

9. The combination of a train-pipe, a metallic or other rigid pipe extending downward and outward from the train-pipe, said pipes having rigidly and inflexibly connected therewith the one a socket and the other a ball, to form a universal joint, a supplemental pipe jointed with said rigid pipe on a horizontal axis, and coupling means on said supplemental pipe, substantially as set forth.

10. The combination of a train-pipe, a metallic or other rigid pipe extending outward and downward from the train-pipe, said pipes having rigidly and inflexibly connected therewith, the one a socket and the other a ball to form a universal joint, a supplemental pipe jointed with said rigid pipe on a horizontal axis, a spring acting between said rigid and supplemental pipes to depress the latter, and coupling means on said supplemental pipe, substantially as set forth.

11. In a fluid-pressure coupling for railway-cars, the combination of a ball-and-socket joint, one member of which is rigid with the car, a horizontal transverse joint, a rigid pipe leading from the other member of said ball-and-socket joint to said horizontal joint, and a coupling means connected with the latter joint, substantially as set forth.

12. In a fluid-pressure coupling for railway-cars, the combination of rigid pipes jointed together on a horizontal axis, a supporting-joint for connecting one of said pipes with the train-pipe, an automatic uncoupling device carried by another of said pipes, and operated by turning the latter pipe to a certain angle, and means whereby the former pipe controls the latter pipe to turn it to the uncoupling position when the former pipe is actuated on its supporting-joint by the separation of the cars, substantially as set forth.

13. In a fluid-pressure coupling for railway-cars the combination of rigid pipes jointed together on a horizontal axis, a supporting-joint for connecting one of said pipes with the train-pipe, an automatic uncoupling device carried by another of said pipes and operated by turning the latter pipe to a certain angle, a stop whereby the former pipe controls the latter pipe to turn it to the uncoupling position when the former pipe is actuated on its supporting-joint by the separation of the cars, and a spring tending to turn the latter pipe to its coupled position, substantially as set forth.

14. In a fluid-pressure coupling for railway-cars, the combination of rigid pipes jointed together, a casing for one of said joints, a coupler carried by one of said pipes next to said casing and a spring inclosed within the casing and connected with the last-mentioned pipe and acting to press the same with its coupler into the coupled position, substantially as set forth.

15. In a fluid-pressure coupling for railway-cars, the combination of rigid pipes jointed together, a casing for one of such joints, a coupler carried by one of said pipes, a spring within the casing and connected with the last-mentioned pipe, to press the coupler to the coupled position, and means for changing the tension of said spring, substantially as set forth.

16. In a fluid-pressure coupling, the combination of a universal joint, one member of which is rigid with the car, a metallic or other rigid pipe leading outward from the other member of said joint, an automatic uncoupling device carried at the outer end of said rigid pipe and jointed thereto whereby it may be turned by hand to the uncoupling position, and a stop carried or operated by said rigid pipe for moving said coupling device into the uncoupling position when said rigid pipe is elevated by the separation of the cars substantially as set forth.

17. In a fluid-pressure coupling for railway-cars, the combination of the pipe M having the casing $m$ formed with a tapering seat $m'$, the plug $n$ fitting said seat and carrying a coupling device and the spring T acting upon the end of the plug, said parts forming a continuous duct, substantially as set forth.

18. In a fluid-pressure coupling for railway-cars, the combination of the pipe M, a casing $m$ having a seat $m'$, a plug $n$ fitting in said seat, and carrying a coupling device, and a stop S arranged at the end of said plug, and adjustable, whereby a lateral movement of the coupler is prevented from unseating said plug, substantially as set forth.

19. In a fluid-pressure coupling for railway-cars, the combination of the pipe M having a casing $m$ formed with a seat $m'$, a plug $n$ fitting in said seat and carrying a coupling device, and closed oil-chambers at the ends of said plug, substantially as set forth.

In testimony whereof I affix my signature in presence of two witnesses.

ALBERT R. MARTIN.

Witnesses:
N. CURTIS LAMMOND,
RICHARD B. CAVANAGH.